United States Patent [19]

Grandmont et al.

[11] Patent Number: 5,116,533
[45] Date of Patent: May 26, 1992

[54] PHOSPHORESCENT MARKING MATERIAL

[76] Inventors: William Grandmont, P.O. Box 808, Brockton, Mass. 02403; Paula Rendino, 36 Salisbury Rd., Watertown, Mass. 02172

[21] Appl. No.: 713,622

[22] Filed: Jun. 11, 1991

Related U.S. Application Data

[63] Continuation of Ser. No. 504,884, Apr. 5, 1990, abandoned.

[51] Int. Cl.$^5$ .................. C09K 11/02; C09K 11/00; B43K 19/00
[52] U.S. Cl. .................. 252/301.36; 106/19; 401/49
[58] Field of Search .................. 252/301.36; 106/19; 401/49

[56] References Cited

U.S. PATENT DOCUMENTS

| | | | |
|---|---|---|---|
| 966,251 | 8/1910 | Simson | 252/301.36 |
| 2,317,159 | 4/1943 | Weil | 252/301.36 |
| 2,347,644 | 5/1944 | Sell | 401/49 |
| 2,380,126 | 7/1945 | Sturm | 401/49 |
| 3,057,806 | 10/1962 | Switzer | 106/19 |
| 3,392,123 | 7/1968 | Winberg | 106/19 |
| 3,565,815 | 2/1971 | Christy | 252/301.36 |
| 4,768,987 | 9/1988 | Usui et al. | 106/19 |

FOREIGN PATENT DOCUMENTS

| | | | |
|---|---|---|---|
| 0070132 | 11/1977 | Japan | 106/19 |
| 123686 | 11/1984 | Japan | 106/19 |

*Primary Examiner*—Prince Willis, Jr.
*Assistant Examiner*—Jerry D. Johnson
*Attorney, Agent, or Firm*—Herbert L. Bello

[57] ABSTRACT

A non-toxic moldable phosphorescent marker has phosphorescent pigment particles that are suspended in a milled mixture of an inert filler and a wax blend base. The phosphorescent pigment particles, which impart luminescent properties to the marker, are excited by light. The composition of the marker is such that it leaves a strip of phosphorescent marking material on a surface against which the marker is rubbed. The deposited material contains the suspended phosphorescent particles, which luminesces when excited by light.

14 Claims, 1 Drawing Sheet

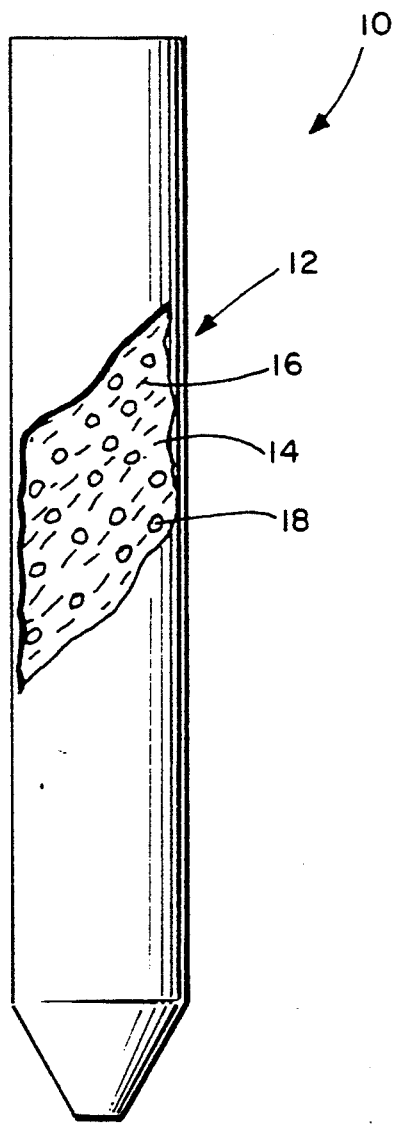

PHOSPHORESCENT MARKING MATERIAL

This application is a continuation of application Ser. No. 07/504,884, filed Apr. 5, 1990, now abandoned.

BACKGROUND OF THE INVENTION

1. Field of Invention

The present invention relates to phosphorescent or photoluminescent materials and, more particularly, is directed to a non-toxic phosphorescent marking material and a method of marking same.

2. Description of the Prior Art

It has long been recognized that the appeal of certain toys can be enhanced by imparting phosphorescent properties to the various elements thereof. Crayons have become a standard teaching tool for children because they allow children to express themselves artistically. Crayons are clean, safe and easy to use. A need exists for a phosphorescent marker which is safe for children.

Heretofore it has been possible to impart phosphorescent properties to paint and chalk due to their thick viscosity. For example, phosphorescent pigments can be mixed in paint. U.S. Pat. No. 2,396,219 discloses a phosphorescent chalk writing material which is toxic and unsafe for use by children. In addition, chalk makes dust which is not optimal for a permanent clean marking material. The use of a phosphorescent material such as calcium sulphide phosphor in a crayon is not acceptable because calcium sulphide phosphor is toxic and it will settle out. The use of non-toxic phosphorescent pigments in a wax base marking material has been met with limited success because of the lack of a suitable suspension formula and an acceptable suspension process. Currently available phosphorescent pigment particles that are encapsulated in glass frit are heavy and cannot be effectively made into a phosphorescent crayon by conventional methods because the particles settle out of the formula and/or are not distributed throughout the crayon. Autoradiogram marking pens, such as the phosphorescent ink marking pen disclosed in U.S. Pat. No. 4,510,392, are sufficient for exposing film, but they have very low luminous properties for visual effects.

While non-toxic phosphorescent material is available, the pigment is generally unsuitable for use in wax base marking materials because of the problems and difficulties in suspending the phosphorescent material in the base mixture. U.S. Pat. No. 3,392,123 discloses an oxygen activated, wax based, chemiluscent marking material. The marking material is limited in use because it can be activated only once and the tetrakis (demethylamino) ethylene contained therein is corrosive. A need exists for a non-toxic wax base marking material containing suspended phosphorescent particles which can be molded or extruded.

SUMMARY OF THE INVENTION

It is an object of the present invention to provide a non-toxic phosphorescent marker which does not suffer from the disadvantages and limitations of existing phosphorescent markers.

Another object of the present invention is to provide an effective phosphorescent wax base marking material which can be utilized for a variety of applications including use as glow in the dark crayons for children.

A further object of the present invention is to provide a non-toxic phosphorescent pigment marker which is composed of a wax base and inert filler mixture, the filler being at least partially transparent to actinic radiation. Phosphorescent pigment particles are suspended in the wax base and filler mixture. The weight of phosphorescent particles is in the range of 10% to 50% of the total weight of the marking material. The composition of the marking material is such that a strip of the marking material is rubbed off or deposited on a surface when the marker is rubbed against the surface. The deposited material contains the suspended phosphorescent particles which luminesce when excited by light.

Yet another object of the present invention is to provide a method for making a non-toxic wax base phosphorescent marker. The process comprises the steps of mixing a plurality of phosphorescent particles with a wax base having an inert filler mixed therewith. The wax base and filler mixture are at least partially transparent to actinic radiation. The wax base and filler mixture is such that it is capable of keeping phosphorescent particles suspended therein, the particle sizes being in the range of 5 to 20 microns.

The invention accordingly comprises the method and apparatus, and together with their steps, parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawing, wherein the drawing is a perspective view of a crayon embodying the invention.

DETAILED DESCRIPTION OF THE PREFERRED EMBODIMENTS

Referring now to the drawing, there is shown a marking material 10 in the form of a crayon. Crayon 10 is composed of a carrier 12, which includes a base 14 and filler particles 16, and a plurality of phosphorescent pigment particles 18 are suspended in the carrier.

Base 14 is composed of a material which is suitable for molding or extrusion. In the preferred embodiment, base 14 is a wax base vehicle, for example micro-crystalline wax or bees wax, or a soap base or a blend thereof. In an alternative embodiment, base 14 is composed of a plastic that is compatible with the other components, for example, a plastic such as a low density plastic. Non-toxic petrolatum, such as petroleum jelly or mineral oil, is added to base 14 to form a base mixture that has a somewhat greasy configuration. Stearic acid or cetyl alcohol or stearyl alcohol or hydrogenated castor bean oil is added to the base mixture to impart a crumbly effect. A wax, for example, Fischer Traupe wax or paraflint or carnauba wax, is added to the base mixture for the purpose of imparting hardness to the base mixture. In an alternative embodiment, a low density plastic, for example a polyethylene such as that sold under the trade name AC6, is added to the base mixture to impart hardness and strength. Also, it has been found that a vinyl resin, such as that sold under the trade name ELVAX, imparts hardness and strength to the base mixture. The base wax mixture is then heated and melted to form a final base mixture or base 14, the mixture being heated to a temperature in the range of 160°

F. to 250° F., preferably 175° F. to 200° F. It is preferred that the mixture is remained at a temperature in the range of 170° F. to 200° F. during processing.

Filler particles 16 are added to the melted base mixture 14. The filler particles 16 which are composed of an inert filler material such as magnesium silicate or powdered talc, having particle sizes in the range of 8-10 microns, are transparent or partially transparent to actinic radiation. In addition, filler particles 16 have a low density so that they remain suspended in the base mixture 14. The quantity of filler particles 16 by percent of total weight is in the range of 10% to 30% and preferably, 13% to 20%. The filler particles 16 are dispersed uniformly in the base material by mixing or milling or whipping. Preferably, the base/filler mixture is milled using, for example, a Tri-Homo colloid mill which is operating at 3700 rpm. The base/filler mixture exhibits anti-settling properties for the phosphorescent pigment particles 18 so that the phosphorescent particles remain suspended in the base/filler mixture and do not settle to the bottom of the base/filler mixture.

Next, phosphorescent pigment particles 18, for example, a non-toxic pigment having particle sizes in the range of 5-20 microns, are added and stirred or whipped into the base/filler mixture until the particles are evenly disbursed therein. In one embodiment, the base/filler/pigment particle mixture was whipped at approximately 1000 rpm for 2-3 minutes using a standard Lightning mixer that was equipped with a shear blade. The quantity of phosphorescent pigment particles by percent of total weight is in the range of 20% to 50% and, preferably, in the range of 25% to 35%. The resulting mixture is suited to be molded or extruded without settling over a temperature range of 170° to 275° F.

In a specific embodiment of the invention, approximately twelve phosphorescent crayons were made by first combining or mixing 20 grams of paraffin wax, 15 grams of Mobil 2305 micro wax, 7.5 grams of petroleum jelly, 5 grams of stearic acid and 2.5 grams of Fisher Traupe wax. Then, the mixture is heated to a temperature in the range of 195° F. to 200° F. to form a melted base mixture. Once heated, the mixture is maintained at a temperature in the approximate range of 170° F. to 200° F. until it is finally cooled. Next, 15 grams of No. 1250 micro talc is added to the base mixture and milled using a colloid mill to form a base/filler mixture. Next, 25 grams of phosphorous pigment, such as Hanovia Brand P1000, is added to the base/filler mixture and whipped at approximately 1000 rpm for 2-3 minutes to form a final marking mixture. The final marking mixture is poured into a mold and cooled. It is preferred that the poured mixture and/or mold is actively cooled. After cooling, the crayon is removed from the mold. The crayon marked well on a variety of surfaces. The phosphorescent pigment particles impart luminescent properties to the crayon and luminesce when excited by light. In one test, the marking material was rubbed onto a surface. The strip left on the surface luminesced brightly for four to ten seconds and continued to luminesce for approximately six hours. It is to be understood that, in another embodiment, the crayons are extruded rather than molded.

In another embodiment of the invention, a base mixture composed of a mixture of 20 grams of paraffin wax, 15 grams of Mobil 2305 micro wax, 9.5 grams of petroleum jelly, 5 grams of stearic acid and 2.5 grams of Fisher Traupe wax is heated to a temperature in the range of 195° F. to 200° F. until the mixture is melted. Once heated, the mixture is maintained at a temperature in the approximate range of 170° F. to 200° F. until final cooling. Next, 15 grms of No. 1250 micro talc is added to the melted mixture and milled using a colloid mill to form a base/filler mixture. Next, 35 grams of phosphorescent pigment particles (P1000) is added to the base/filler mixture and the resulting is whipped at at approximately 1000 rpm for 2-3 minutes to form a final marking mixture. Next, the final marking mixture is poured into a mold having a desired shape, for example the shape of a crayon. The poured mixture and/or mold is passively or actively cooled. Finally, after cooling, the finished crayon 10 is removed from the mold. Alternately, the resulting whipped mixture is fed to an extruder and extruded into a desired shape.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A phosphorescent marking material comprising a wax base vehicle, filler particles, and phosphorescent particles, said phosphorescent particles being suspended in a mixture of said wax base vehicle and said filler particles, said mixture comprising a range of 10 percent to 30 percent by weight of said filler particles and a range of 10 to 50 percent by weight of said phosphorescent particles, said phosphorescent particles having a particle size in the size range of 5 to 20 microns, said filler particles being at least partially transparent to actimic radiation.

2. The marking material as claimed in claim 1 wherein said phosphorescent particles by percent of total weight is in the range of 20% to 50%.

3. A method of suspending pigment particles in a wax medium to allow molding and extrusion, said method comprising the steps of:
   (a) preparing a blend of waxes;
   (b) melting said wax blend;
   (c) mixing an inert filler material with said wax blend to form a wax/filler mixture;
   (d) milling said wax/filler mixture to form a uniform suspension to said inert filler material in said wax blend;
   (e) mixing pigment particles having a particle size in the size range of 5 to 20 microns into said milled wax/filler mixture to form a final blend, said final blend being a continuous, non-settling suspension of said pigment particles in said mixture of said filler material and said wax blend and having in the range of 10 percent to 30 percent by weight of said filler particles and a range of 10 to 50 percent by weight of said pigment particles; and
   (f) whipping said final blend.

4. The method as claimed in claim 3 wherein said wax/filler mixture is milled in a colloid mill.

5. The method as claimed in claim 3 wherein the quantity of said inert filler by total weight is in the range of 13% to 20%.

6. The method as claimed in claim 3 wherein said inert filler material is inert filler particles having a particle size in the range of 8 to 10 microns.

7. The method as claimed in claim 3 wherein said filler material is at least partially transparent to actinic radiation.

8. The method of claim 3 wherein said pigment particles comprise phosphorescent particles.

9. The method of claim 8 wherein the percent by weight of said phosphorescent particles is in the range of 20% to 50%.

10. The method as claimed in claim 9 wherein the quantity of said phosphorescent particles by total weight is in the range of 25% to 35%.

11. A method of making a phosphorescent marker having a wax blend base comprising the steps of:
 (a) melting a wax blend;
 (b) adding a filler material to the melted wax blend;
 (c) milling said filler material and melted wax blend to form a uniform suspension of said filler material in said wax blend;
 (d) adding phosphorescent pigment particles in the size range of 5 to 20 microns to said milled filler and melted wax blend;
 (e) whipping said phosphorescent pigment particles and milled filler and melted wax blend to form a continuous, non-settling suspension of said phosphorescent pigment particles in said milled filler material and melted wax blend, said suspension having in the range of 10 to 30 percent by weight filler material and in the range of 10 to 50 percent by weight of said pigment particles; and
 (f) forming said whipped phosphorescent pigment particles and milled filler and melted wax blend into a desired shape.

12. A phosphorescent marker comprising a whipped mixture of an inert milled filler and wax base blend, and phosphorescent particles, said filler being at least partially transparent to actinic radiation, said phosphorescent particles being in the size range of 5 to 20 microns and continuously suspended in said whipped mixture, said whipped mixture comprising between 10 and 30 percent by weight of said filler and between 10 and 50 percent by weight said phosphorescent particles.

13. The phosphorescent marker as claimed in claim 12 wherein the percent by total weight of said phosphorescent particles is in the range of 205 to 50%.

14. The phosphorescent marker as claimed in claim 13 wherein said filler and wax blend includes an inert filler having particles in the size range of 8 to 10 microns.

* * * * *

UNITED STATES PATENT AND TRADEMARK OFFICE
CERTIFICATE OF CORRECTION

PATENT NO. : 5,116,533
DATED : May 26, 1992
INVENTOR(S) : William Grandmont and Paula Rendino It is certified that error appears in the above-identified patent and that said Letters Patent is hereby corrected as shown below:

Claim 3, column 4, line 46, change "to" to -- of --.

Claim 13, column 6, line 18, change "205" to -- 20% --.

Signed and Sealed this

Twenty-eighth Day of December, 1993

Attest:

BRUCE LEHMAN

*Attesting Officer*  *Commissioner of Patents and Trademarks*